(12) United States Patent
Yang et al.

(10) Patent No.: US 11,507,298 B2
(45) Date of Patent: Nov. 22, 2022

(54) COMPUTATIONAL STORAGE SYSTEMS AND METHODS

(71) Applicant: PetaIO Inc., Santa Clara, CA (US)

(72) Inventors: Fan Yang, Fremont, CA (US); Changyou Xu, San Jose, CA (US); Lingqi Zeng, San Jose, CA (US)

(73) Assignee: PETAIO INC., Santa Clara, CA (US)

( * ) Notice: Subject to any disclaimer, the term of this patent is extended or adjusted under 35 U.S.C. 154(b) by 23 days.

(21) Appl. No.: 16/996,522

(22) Filed: Aug. 18, 2020

(65) Prior Publication Data

US 2022/0057959 A1 Feb. 24, 2022

(51) Int. Cl.
*G06F 3/06* (2006.01)
*G06F 15/80* (2006.01)
*G06F 13/28* (2006.01)
*G06F 13/42* (2006.01)

(52) U.S. Cl.
CPC .......... *G06F 3/0655* (2013.01); *G06F 3/0604* (2013.01); *G06F 3/0679* (2013.01); *G06F 13/28* (2013.01); *G06F 13/4221* (2013.01); *G06F 15/803* (2013.01)

(58) Field of Classification Search
CPC ..... G06F 15/803; G06F 15/7821; G06F 13/28
USPC ............................................................ 710/22
See application file for complete search history.

(56) References Cited

U.S. PATENT DOCUMENTS

| | | | | |
|---|---|---|---|---|
| 9,747,158 B1* | 8/2017 | Kannan | ................. | G06F 11/076 |
| 2007/0073923 A1* | 3/2007 | Vemula | ................... | G06F 13/28 |
| | | | | 710/22 |
| 2009/0119353 A1* | 5/2009 | Oh | ........................ | G06F 3/0679 |
| 2009/0150894 A1* | 6/2009 | Huang | .................. | G06F 3/0688 |
| | | | | 710/22 |
| 2010/0262721 A1* | 10/2010 | Asnaashari | .......... | G06F 3/0659 |
| | | | | 710/22 |
| 2013/0268701 A1* | 10/2013 | Asnaashari | .......... | G06F 13/161 |
| | | | | 710/22 |
| 2014/0181365 A1* | 6/2014 | Fanning | ................. | G06F 13/28 |
| | | | | 711/103 |
| 2014/0317447 A1* | 10/2014 | Colgrove | ............. | G06F 3/0688 |
| | | | | 714/6.24 |

\* cited by examiner

*Primary Examiner* — Titus Wong
(74) *Attorney, Agent, or Firm* — Stevens Law Group; David R. Stevens (57) ABSTRACT

Example computational storage systems and methods are described. In one implementation, a storage drive controller includes a non-volatile memory subsystem to process multiple commands. Multiple versatile processing arrays are coupled to the non-volatile memory subsystem. The multiple versatile processing arrays can process multiple in-situ tasks. A host direct memory access module provides direct access to at least one memory device.

17 Claims, 12 Drawing Sheets

FIG. 14

COMPUTATIONAL STORAGE SYSTEMS AND METHODS

TECHNICAL FIELD

The present disclosure relates to systems and methods that support in-situ processing for computational storage devices.

BACKGROUND

Advancements in computing technology has increased the demand for high-performance computational storage. For example, new computational storage systems may utilize in-situ processing to meet customer needs regarding data storage and high-speed data processing. In-situ processing refers to processing data where it is stored, such as in solid-state drives (SSDs) or memory devices. A computational storage drive is a device that provides data processing services associated with a storage system. Computational storage drives typically support parallel computation, off-loading of host processing, and a reduction in I/O (Input/Output) traffic.

In some implementations, computational storage drives represent a storage subsystem that includes one or more processors located on the storage media or on the controller for the storage media. These computational storage drives provide computational storage services to one or more systems, devices, and the like. The expansion of computing technology is increasing the demand for high-performance computational storage, which increases the demand placed on infrastructure efficiency. Constantly increasing data processing and computing requirements place new challenges on the performance of computational storage drives. Thus, it is desirable to provide a flexible computational storage drive that can adapt to future processing requirements.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The systems and methods described herein include a new approach to handling in-situ processing tasks using a programmable 3-dimensional versatile processing array (3D-VPA). Using the flexibility of the 3D-VPA, the described systems and methods can be reconfigured to meet different needs and system requirements of various computational storage drive installations. These systems and methods provide high performance, efficient use of power, and flexibility to support future applications of computational storage drives.

Figure 1:
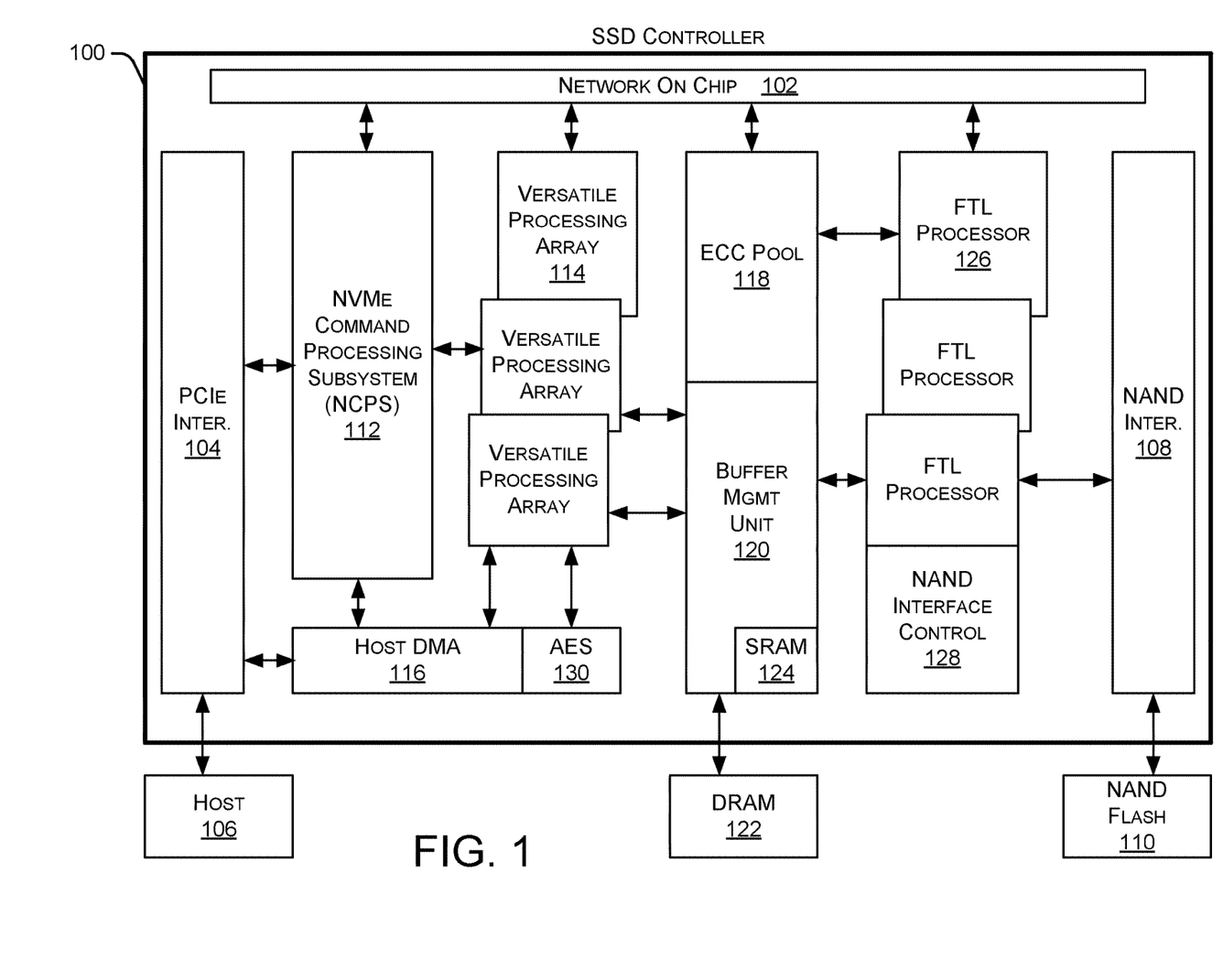
FIG. 1 is a block diagram illustrating a solid-state drive (SSD) controller with a 3-dimensional versatile processing array (3D-VPA).

FIG. 1 is a block diagram illustrating an SSD controller 100 with a 3-dimensional versatile processing array (3D-VPA). As shown in FIG. 1, SSD controller 100 includes a network on chip 102 that allows SSD controller 100 to communicate with other components and devices within SSD controller 100. A PCIe (Peripheral Component Interconnect Express) interface 104 provides an interface to a host 106 as well as a NVMe (Non-Volatile Memory Express) command processing subsystem 112 and a host DMA (Direct Memory Access) module 116. PCIe interface 104 provides a high-speed serial computer bus that supports high-speed communication between the PCIe interface and host 106, host DMA 116, and NVMe command processing subsystem 112.

NVMe command processing subsystem 112 includes a submission and completion queue mechanism. Commands are placed by host software into a submission queue and completions are placed into an associated completion queue. For example, host software places the data processing commands defined by customers into a submission queue and the controller returns the completions after executing the commands. In some embodiments, NVMe command processing subsystem 112 includes multiple CPUs, an inter-processor communication channel, and one or more acceleration engines. Additional details regarding the operation of NVMe command processing subsystem 112 are discussed herein.

In some embodiments, host DMA 116 allows various components shown in FIG. 1 to access memory devices independently of a central processing unit (CPU) or other processor. SSD controller 100 also includes a 3D-VPA 114, which includes multiple versatile processing arrays as shown in FIG. 1. 3D-VPA 114 is coupled to communicate with network on chip 102, NVMe command processing subsystem 112, host DMA 116, a buffer management unit (BMU) 120, and an AES (advanced encryption standard) engine 130. 3D-VPA 114 is a configurable versatile processing array that supports the increased in-situ processing demands of particular systems. 3D-VPA 114 works with NVMe command processing subsystem 112 to process both NVMe commands and vendor unique processing commands (VUPC) simultaneously. By leveraging the extension instruction set from the CPU and the flexibility of an FPGA (Field-Programmable Gate Array) circuit, 3D-VPA 114 can be configured according to a customer's requirements. Additionally, the host software is able to dynamically configure 3D-VPA 114 and change the function of a VPA through vendor unique admin commands (VUAC) before sending the VUPC. 3D-VPA 114 provides seamless interfaces to the NVMe command and data path, which makes the VPA suitable for the host to offload tasks and data in-line processing. Additional details regarding 3D-VPA 114 and its operation are discussed herein. The architecture shown in FIG. 1 can handle a variety of computation tasks, including any number of in-situ processing activities.

As shown in FIG. 1, 3D-VPA 114 is positioned between host DMA 116 and buffer management unit 120. In some embodiments, there are four interfaces between 3D-VPA 114 and the other modules. A command interface between 3D-VPA 114 and NVMe command processing subsystem 112 is used to configure and pass requests to 3D-VPA 114. The vendor unique commands are processed by NVMe command processing subsystem 112 and then passed to 3D-VPA 114. Three data interfaces link 3D-VPA 114 to host DMA 116, AES 130, and buffer management unit 120. This configuration makes 3D-VPA 114 suitable for both host off-load tasks and in-line processing.

An ECC (Error Correction Code) pool 118 is coupled to network on chip 102, an FTL (Flash Translation Layer) processor 126, and buffer management unit 120. On the encoding side, ECC pool 118 reads the user data from buffer management unit 120, generates parity, and sends the data and parity to FTL processor 126 and NAND interface control 128. On the decoding side, ECC pool 118 receives data from FTL processor 126 and NAND interface control 128, then writes the decoded data to buffer management unit 120.

As shown in FIG. 1, buffer management unit 120 includes an SRAM (Static Random-Access Memory) 124. In some embodiments, SRAM 124 stores user data and configuration data for 3D-VPA 114. Buffer management unit 120 is coupled to 3D-VPA 114 and a DRAM (Dynamic Random-Access Memory) 122. In some embodiments DRAM 122 stores user data and a logic block address to physical block address table.

As shown in FIG. 1, FTL processor 126 includes multiple individual FTL processors, as discussed in greater detail herein. When working with Flash devices, all LBAs (logical block addresses) that represent the logical size visible to and managed by the file system are mapped to a physical location (e.g., block ID, page ID, and sector ID) of the Flash. As part of the wear leveling and other Flash management algorithms (e.g., bad block management, read disturb management, safe flash handling, etc.), the physical location of an LBA might dynamically change frequently. FTL processor 126 may support these activities. FTL processor 126 is coupled to a NAND interface control 128. In some embodiments, NAND interface control 128 manages reading data from NAND Flash 110 via NAND interface 108 and sends the data to ECC pool 118 or FTL processor 126. NAND interface control 128 is coupled to a NAND interface 108, which is coupled to a NAND flash 110. In some embodiments, NAND interface 108 is coupled to multiple NAND flash devices.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
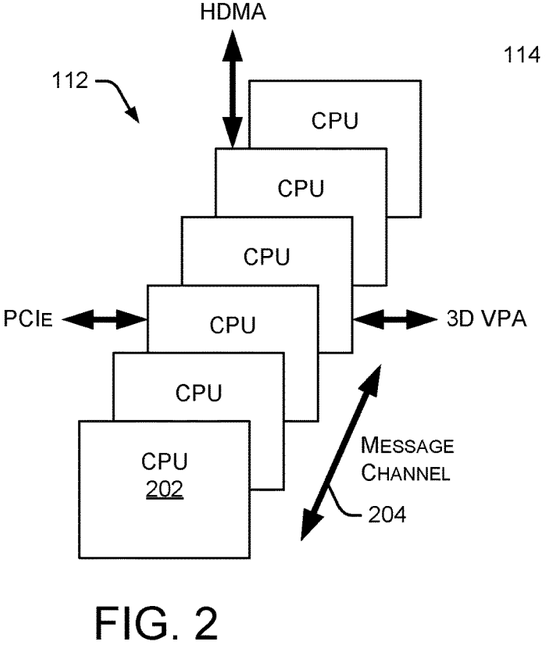
FIG. 2 is a block diagram illustrating an embodiment of an architecture of a NVMe command processing subsystem.

FIG. 2 is a block diagram illustrating an embodiment of an architecture of NVMe command processing subsystem 112. The embodiment shown in FIG. 2 includes six CPUs 202 and one or more message channels 204 that allow the six CPUs 202 to communicate with one another. NVMe command processing subsystem 112 also includes a bus to communicate with PCIe interface 104 and an interface to HDMA (host direct memory access), which can access host DRAM.

In some embodiments, command processing in NVMe command processing subsystem 112 is divided into multiple tasks. For example, tasks such as command fetch, address processing, and command parsing are performed by NVMe command processing subsystem 112. In some embodiments, each CPU 202 executes one task. As shown in FIG. 2, NVMe command processing subsystem 112 also has an interface to 3D-VPA 114.

Figure 3:
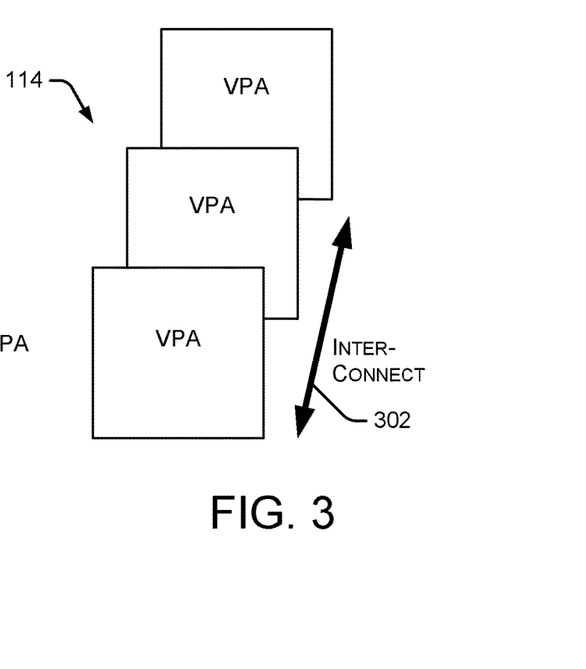
FIG. 3 is a block diagram illustrating an embodiment of an architecture of a 3D-VPA.

FIG. 3 is a block diagram illustrating an embodiment of an architecture of 3D-VPA 114. As illustrated in FIG. 3, 3D-VPA 114 includes multiple VPA slices. The specific embodiment of FIG. 3 includes three slices, but other embodiments may include any number of VPA slices. 3D-VPA 114 also includes an interconnect 302 that allow the multiple VPA slices to communicate with one another. In some embodiments, the multiple VPA slices can perform different tasks in parallel with one another.

Figure 4:
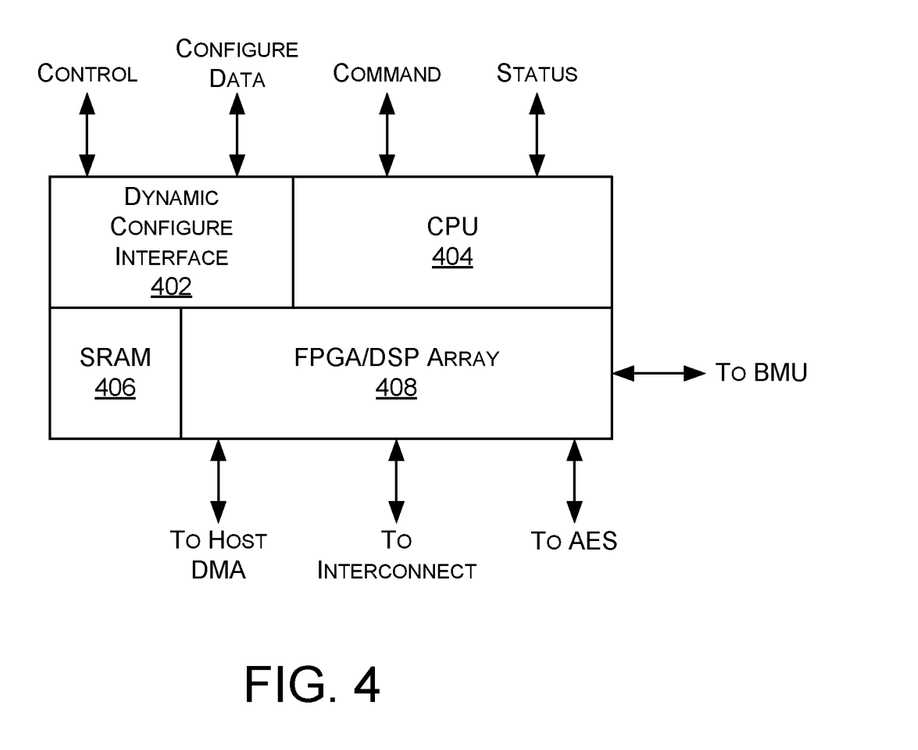
FIG. 4 is a block diagram illustrating an embodiment of an architecture of a slice of the 3D-VPA.

FIG. 4 is a block diagram illustrating an embodiment of an architecture of a slice of the 3D-VPA. Each VPA slice shown in FIG. 4 includes four modules: a dynamic configure interface 402, a CPU 404, an SRAM 406, and an FPGA/DSP (Field-Programmable Gate Array/Digital Signal Processor) array 408. The configurable interconnect logic links together the multiple VPA slices. For example, various data and commands can be communicated between the multiple VPA slices via interconnect 302. As shown in FIG. 4, dynamic configure interface 402 may communicate control information and configuration data to/from other components of SSD controller 100. CPU 404 may communicate command and status information to/from other components. FPGA/DSP array 408 communicates with various components, such as host DMA 116, interconnect 302, AES 130, and BMU 120.

Figure 5:
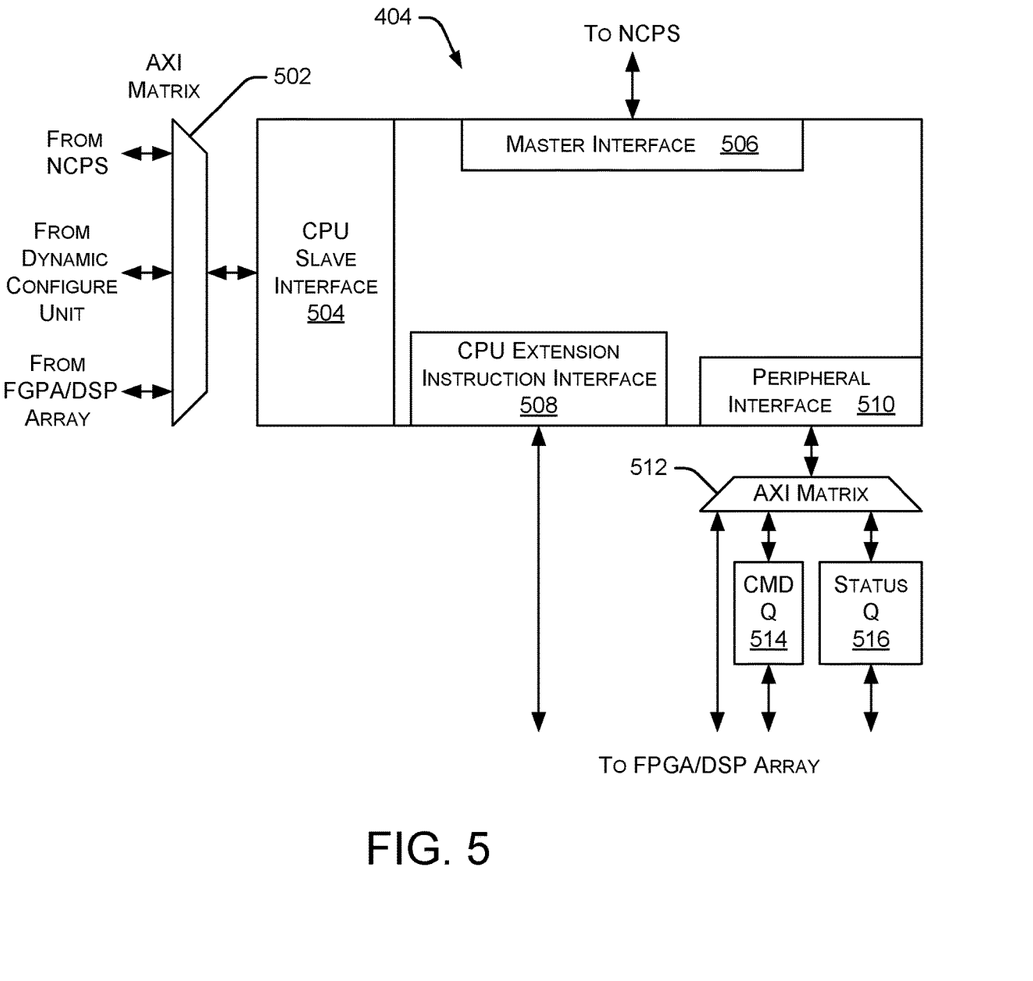
FIG. 5 is a block diagram illustrating an embodiment of an architecture of a central processing unit (CPU) in the 3D-VPA.

FIG. 5 is a block diagram illustrating an embodiment of an architecture of CPU 404 in a VPA slice. CPU 404 is responsible for processing requests from NVMe command processing subsystem 112, controlling FPGA/DSP array 408, and returning the status back to NVMe command processing subsystem 112. The architecture of CPU 404 shown in FIG. 5 includes a CPU slave interface 504, a master interface 506, a CPU extension instruction interface 508, and a peripheral interface 510. CPU slave interface 504, master interface 506, and peripheral interface 510 provide interfaces to various logic components. CPU extension instruction interface 508 is an instruction extension which includes logic to associate with the CPU. Additionally, CPU 404 is coupled to AXI (advanced extensible interface) matrix 502 and AXI matrix 512 as shown in FIG. 5. AXI matrix 512 is coupled to a CMD queue 514 and a status queue 516. AXI matrix 512 is a multiplexor. Based on the incoming address, the data received by AXI matrix 512 is sent to CMD Q 514 or status Q 516. CMD Q 514 is used for sending commands to FPGA/DSP array 408 and status Q 516 is used to receive command execution status information. AXI matrix 502 is a multiplexor that selectively couples CPU slave interface 504 to send or receive data from NVMe command processing subsystem 112, dynamic configure interface 402, or FPGA/DSP array 408.

Figure 6:
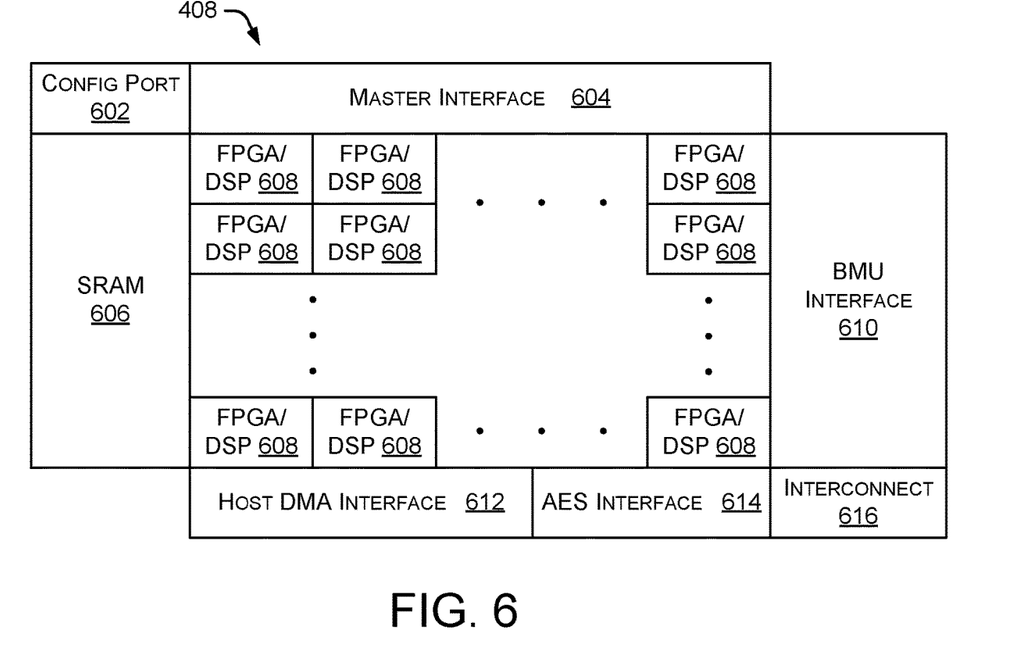
FIG. 6 is a block diagram illustrating an embodiment of an architecture of a FPGA/DSP array in the 3D-VPA.

FIG. 6 is a block diagram illustrating an embodiment of an architecture of FPGA/DSP array 408 in the 3D-VPA. FPGA/DSP array 408 includes a config port 602, a master interface 604, and an SRAM 606. As shown in FIG. 6, FPGA/DSP array 408 also includes multiple FPGA/DSP units 608. Each FPGA/DSP unit 608 can be configured through config port 602. FPGA/DSP array 408 also includes a BMU interface 610, a host DMA interface 612, an AES interface 614, and an interconnect 616.

The dynamic config interface 402 (FIG. 4) manages and controls the config process based on commands from NVMe command processing subsystem 112. The CPU interfaces, such as CPU extension instruction interface 508, allow FPGA/DSP array 408 to integrate with CPU 404 seamlessly.

With the extension instruction set, customers can crate dedicated CPU instructions for in-situ processing with the 3D-VPA. The configurable interconnect links together multiple VPA slices, which enables processing of more complicated tasks.

Figure 7:
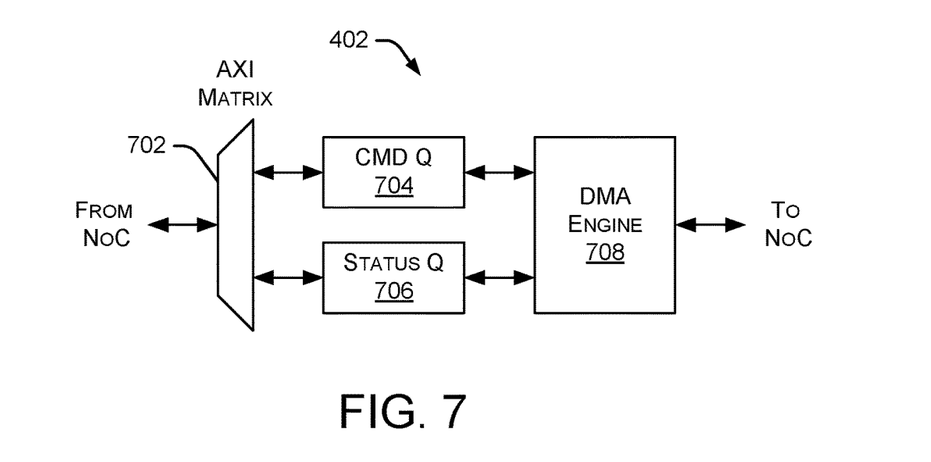
FIG. 7 is a block diagram illustrating an embodiment of an architecture of a dynamic config interface in the 3D-VPA.

FIG. 7 is a block diagram illustrating an embodiment of an architecture of dynamic config interface 402 in the 3D-VPA. As shown in FIG. 7, dynamic config interface 402 includes a DMA engine 708. In some embodiments, DMA engine 708 receives commands from CMD Q 704. Based on the received commands, DMA engine 708 loads config data from buffer management unit 120 and returns a status to Status Q 706.

In some embodiments, NVMe command processing subsystem 112 sends the configuration command to a command queue 704 of dynamic config interface 402. Dynamic config interface 402 reads the command, configures the 3D-VPA, and returns the status. Dynamic config interface 402 can configure the CPU 404 and the FPGA/DSP units 608 independently. In some embodiments, the described systems and methods support partial configuration. Dynamic config interface 402 includes a bus to buffer management unit 120. The configure data can be loaded to buffer management unit 120 by the code download commands and then loaded to the 3D-VPA based on the configuration commands.

During the power-on initialization NVMe command processing subsystem 112 loads default data from, for example, ROM or external serial flash to buffer management unit 120 and issues configuration commands. Additional details regarding runtime code download and configuration process are discussed below. As shown in FIG. 7, AXI matrix 702 receives data from network on chip 102 and DMA engine 708 sends data to network on chip 102. AXI matrix 702 is a multiplexor. Based on an incoming address, AXI matrix 702 sends the data to CMD Q 704 or status Q 706.

In some embodiments, downloading of the runtime code follows the method for processing NVMe admin commands. For example, the host may send the admin command, then the controller processes the command and returns the status to the host after completing the command. In particular implementations, there are two different types of code download flow based on the location of the configuration code. Example locations of the configuration code include NAND flash and host memory.

Figure 8:
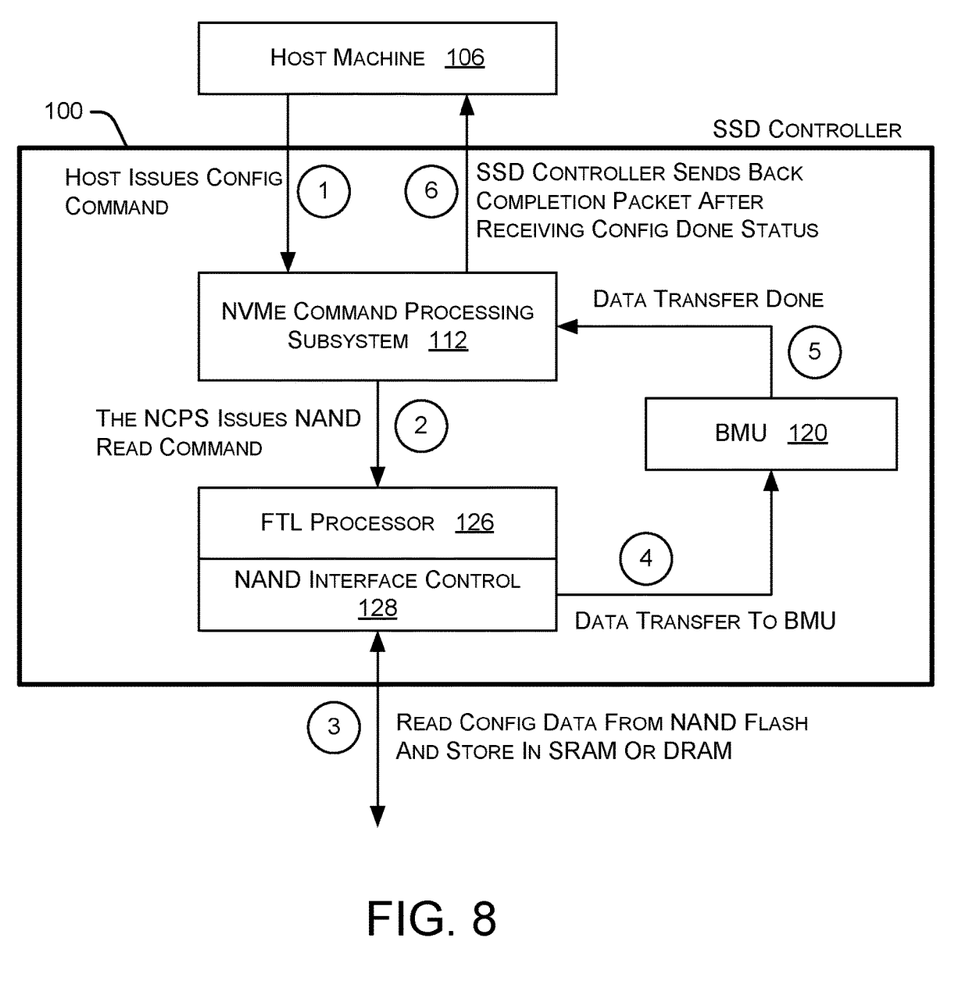
FIG. 8 illustrates an embodiment of a process for loading 3D-VPA codes from the NAND flash.

FIG. 8 illustrates an embodiment of a process for loading 3D-VPA codes (e.g., configuration codes) from the NAND flash. The process of FIG. 8 shows six steps for configuring the 3D-VPA with data from the host memory. The process starts with a data download command from a host machine and ends with a completion packet sent back to the host, as described below.

As shown in FIG. 8, host machine 106 issues (1) a config command that is received by NVMe command processing subsystem 112. The process continues as NVMe command processing subsystem 112 issues a NAND read command (2) to FTL processor 126 and NAND interface control 128. Next, NAND interface control 128 issues (3) a command to read config data from the NAND flash and store the data in SRAM or DRAM. NAND interface control 128 then initiates a data transfer (4) to BMU 120. When the data transfer is finished, BMU 120 communicates (5) a data transfer done notification to NVMe command processing subsystem 112. Finally, after receiving the data transfer done notification, NVMe command processing subsystem 112 sends (6) a completion packet to host machine 106.

Figure 9:
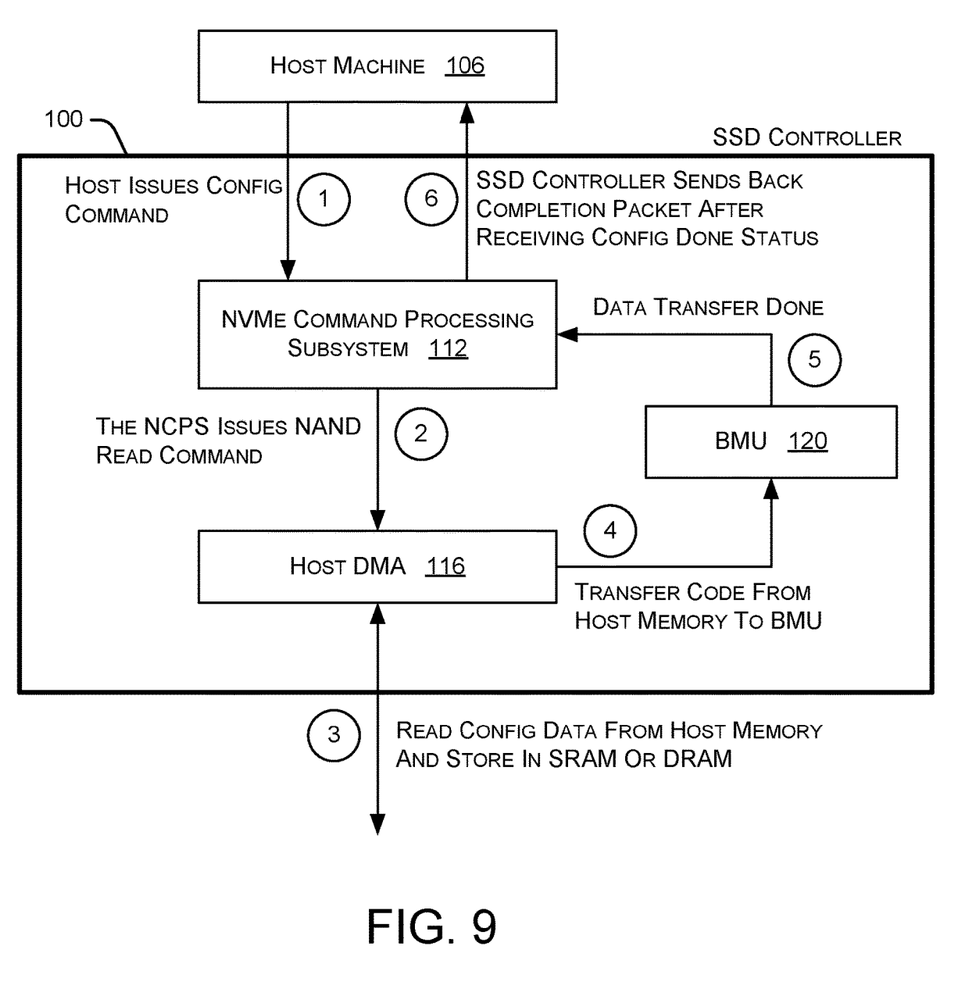
FIG. 9 illustrates an embodiment of a process for loading 3D-VPA codes from the host memory.

FIG. 9 illustrates an embodiment of a process for loading 3D-VPA codes (e.g., configuration codes) from the host memory. The process for downloading data from the host memory is similar to the process of downloading data from the NAND flash as discussed with respect to FIG. 8. The process starts with a data download command from a host machine. The NVMe command processing subsystem controls the host DMA to download config data from the host machine. The config data can be stored in the CMB (controller memory buffer), which is accessible by the host DMA.

The process of FIG. 9 shows six steps for configuring the 3D-VPA with data from the host memory. Initially, host machine 106 issues (1) a config command that is received by NVMe command processing subsystem 112. The process continues as NVMe command processing subsystem 112 issues a NAND read command (2) to host DMA 116. Next, host DMA 116 issues (3) a command to read config data from the host memory and stores the data in SRAM or DRAM. Host DMA 116 then initiates a data transfer (4) from the host memory to BMU 120. When the data transfer is finished, BMU 120 communicates (5) a data transfer done notification to NVMe command processing subsystem 112. Finally, after receiving the data transfer done notification, NVMe command processing subsystem 112 sends (6) a completion packet to host machine 106.

Figure 10:
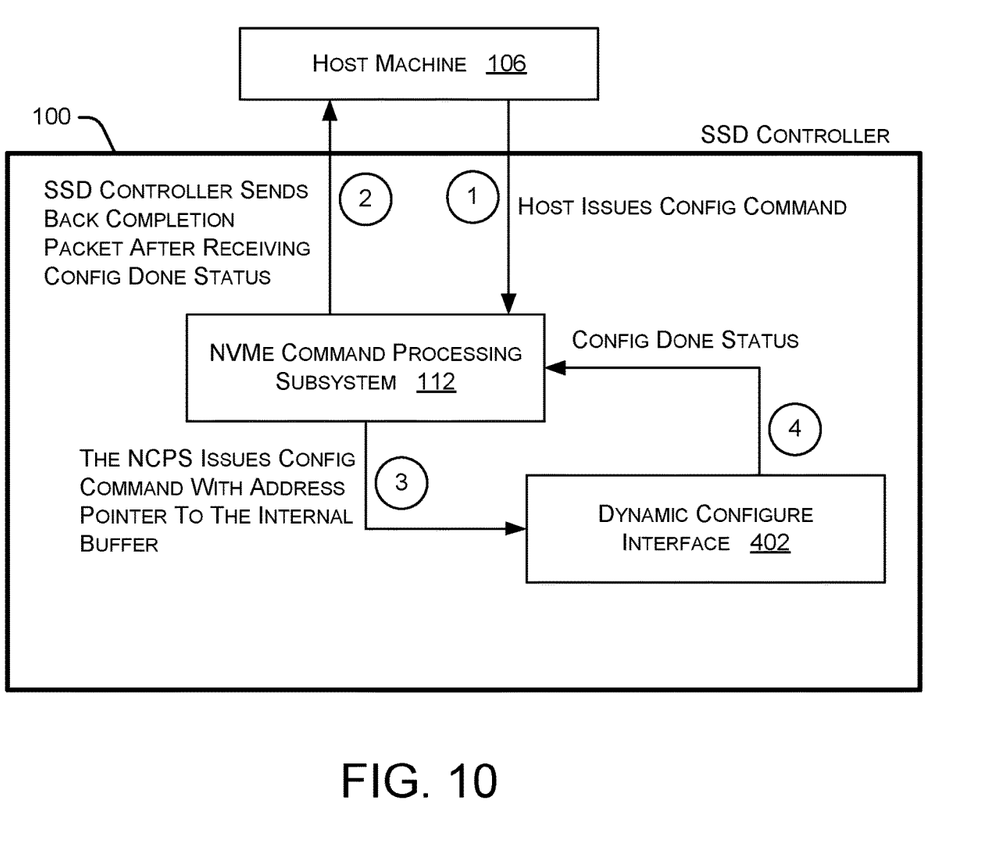
FIG. 10 illustrates an embodiment of a dynamic configuration flow for the 3D-VPA.

FIG. 10 illustrates an embodiment of a dynamic configuration flow for the 3D-VPA. In some embodiments, a runtime update is different from a power-on initialization. As shown in FIG. 10, the process begins with host machine 106 issuing a config command (1) to NVMe command processing subsystem 112. The command is processed by NVMe command processing subsystem 112, which issues (3) a config command with an address pointer to the internal buffer by sending the config command to dynamic configure interface 402. When the configuration is complete, dynamic configure interface 402 communicates a config done status update to NVMe command processing subsystem 112. SSD controller 100 then sends (2) a completion packet to host machine 106.

In some embodiments, dynamic configure interface 402 loads the config data to the 3D-VPA when it is in idle state. Dynamic configure interface 402 supports several levels of config commands, such as 3D-VPA update, slice update, CPU update, FPGA/DSP update, and interconnect update. The duration of the configuration is decided based on the amount of config data. For example, it takes more time to update the entire 3D-VPA than updating, for example, a single slice. In some embodiments, a partial update may be recommended for an on-the-fly update.

The VPA slices in 3D-VPA 114 can be configured individually to perform various tasks. For example, each VPA slice can perform an assigned task in parallel with the other VPA slices which may be performing the same or different tasks. Example tasks may include performing data compression, decompression of compressed data, and the like.

Figure 11:
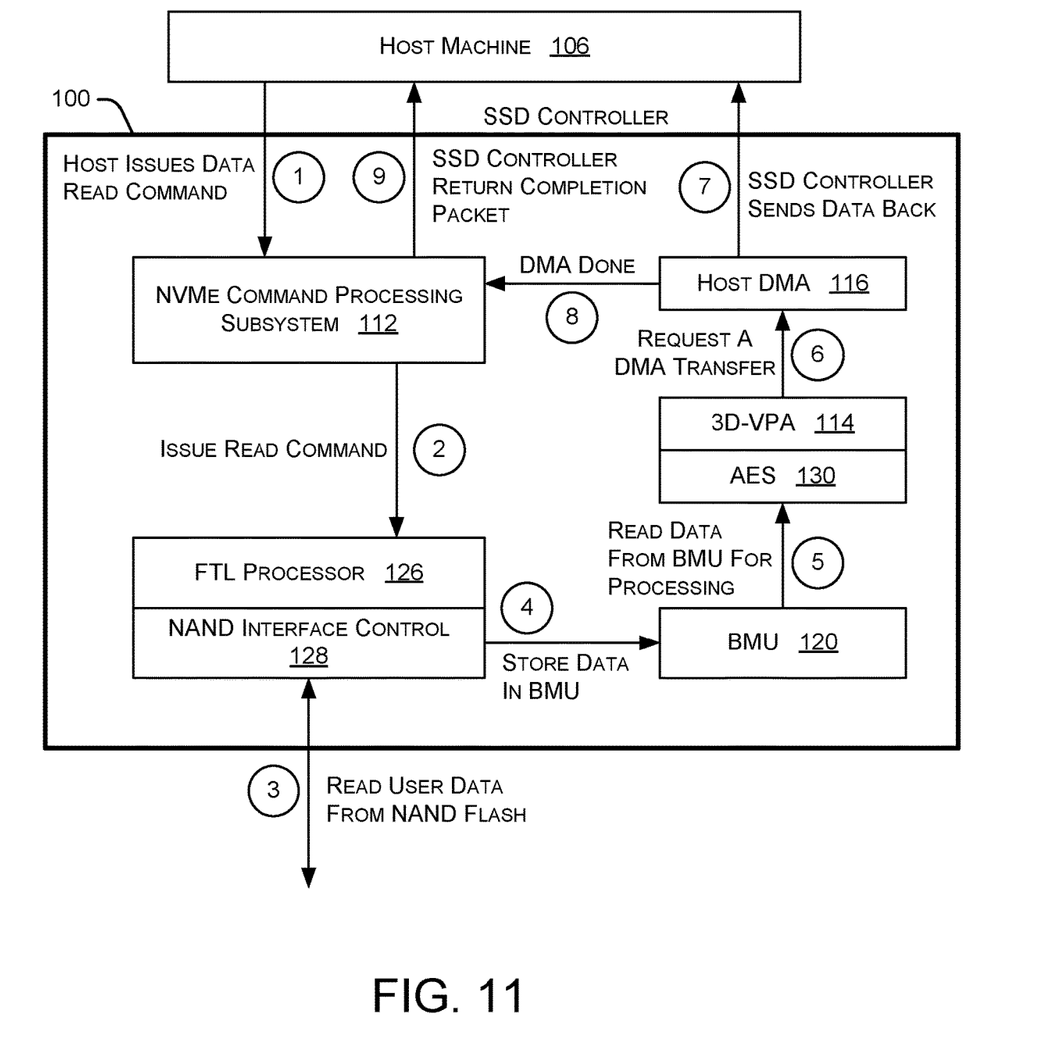
FIG. 11 illustrates an embodiment of a flow for a read command with an in-situ processing request.

FIG. 11 illustrates an embodiment of a flow for a read command with an in-situ processing request. The example of FIG. 11 shows an example process for NVMe commands. Host machine 106 sends a data read command to SSD controller 100 and receives back the status after the command is completed. Based on the processing requirements, the in-situ processing can be divided into, for example, two types: in-line processing and host off-load processing.

The 3D-VPA has interfaces between the host DMA, AES engines, and the BMU. Together with the FPGA/DSP and the CPU, the 3D-VPA provides a flexible solution for on-the-fly data processing, such as security, data verification, real-time machine learning, and the like. An example host read procedure is shown in FIG. 11.

Initially, host machine 106 issues (1) a data read command to NVMe command processing subsystem 112, which communicates (2) the read data command to FTL processor 126 and NAND interface control 128. NAND interface control 128 reads (3) user data from a NAND flash and stores (4) the data in BMU 120. AES 130 reads (5) data from BMU 120 for processing and 3D-VPA 114 sends (6) a DMA transfer request to host DMA 116. Host DMA 116 sends (7) the data back to host machine 106 and sends (8) a DMA done status to NVMe command processing subsystem 112. Finally, NVMe command processing subsystem 112 sends (9) a completion packet to host machine 106.

Figure 12:
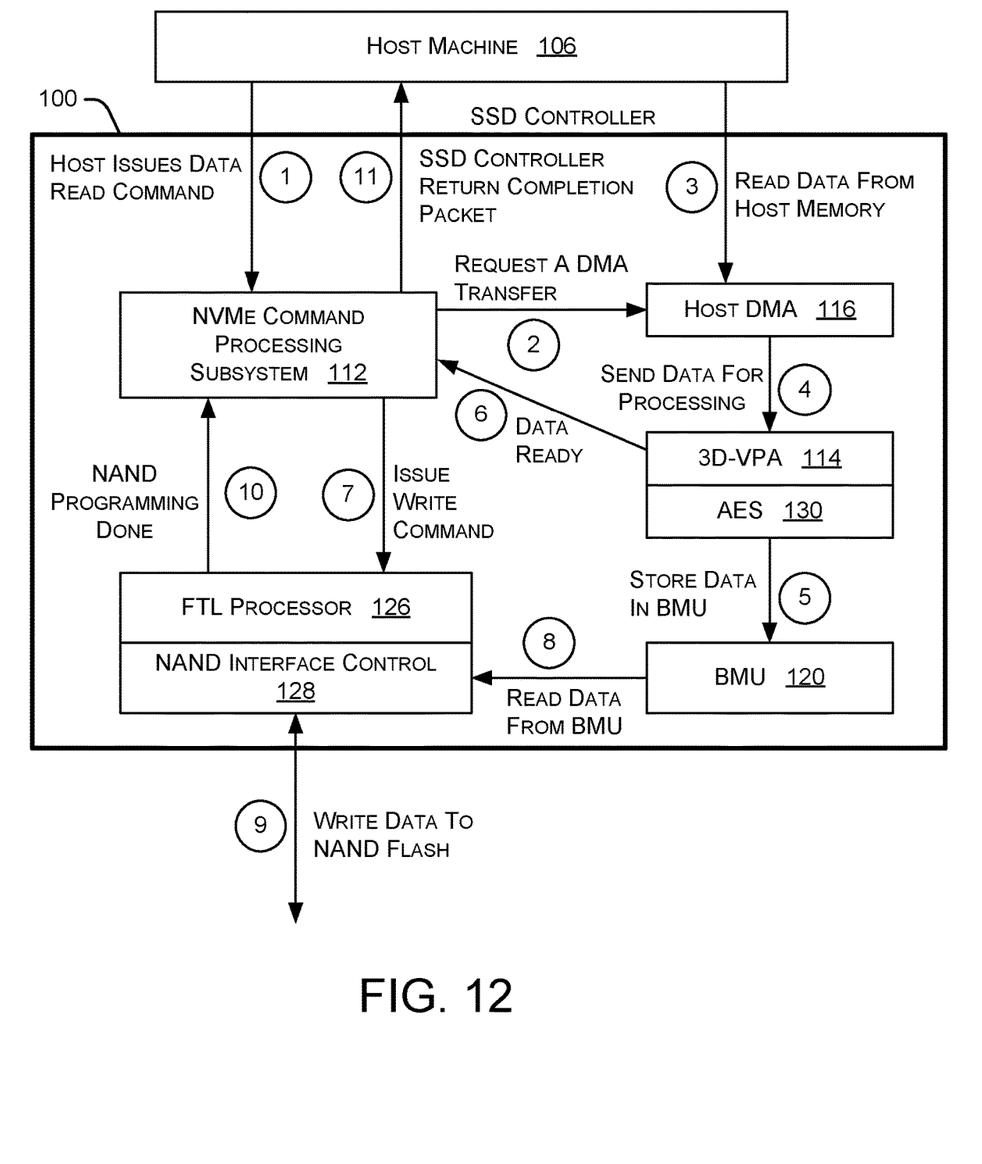
FIG. 12 illustrates an embodiment of a flow for a write command with an in-situ processing request.

FIG. 12 illustrates an embodiment of a flow for a write command with an in-situ processing request. In some embodiments, the write operation is the reverse of the read operation. For example, host machine 106 issues a data read command, SSD controller 100 interprets the command, and writes the data to a NAND flash.

Initially, host machine 106 issues (1) a data read command to NVMe command processing subsystem 112, which communicates (2) a DMA transfer request to host DMA 116. As shown in FIG. 12, host DMA 116 also reads (3) data from host memory in host machine 106. Host DMA 116 then sends (4) the data to 3D-VPA 114, which communicates (6) a data ready status update to NVMe command processing subsystem 112. AES 130 stores (5) the data in BMU 120. NVMe command processing subsystem 112 issues (7) a write command to FTL processor 126. NAND interface control 128 reads (8) the data from BMU 120 and writes (9) the data to NAND flash. FTL processor 126 then communicates (10) a NAND programming done status update to NVMe command processing subsystem 112, which sends (11) a completion packet to host machine 106.

Figure 13:
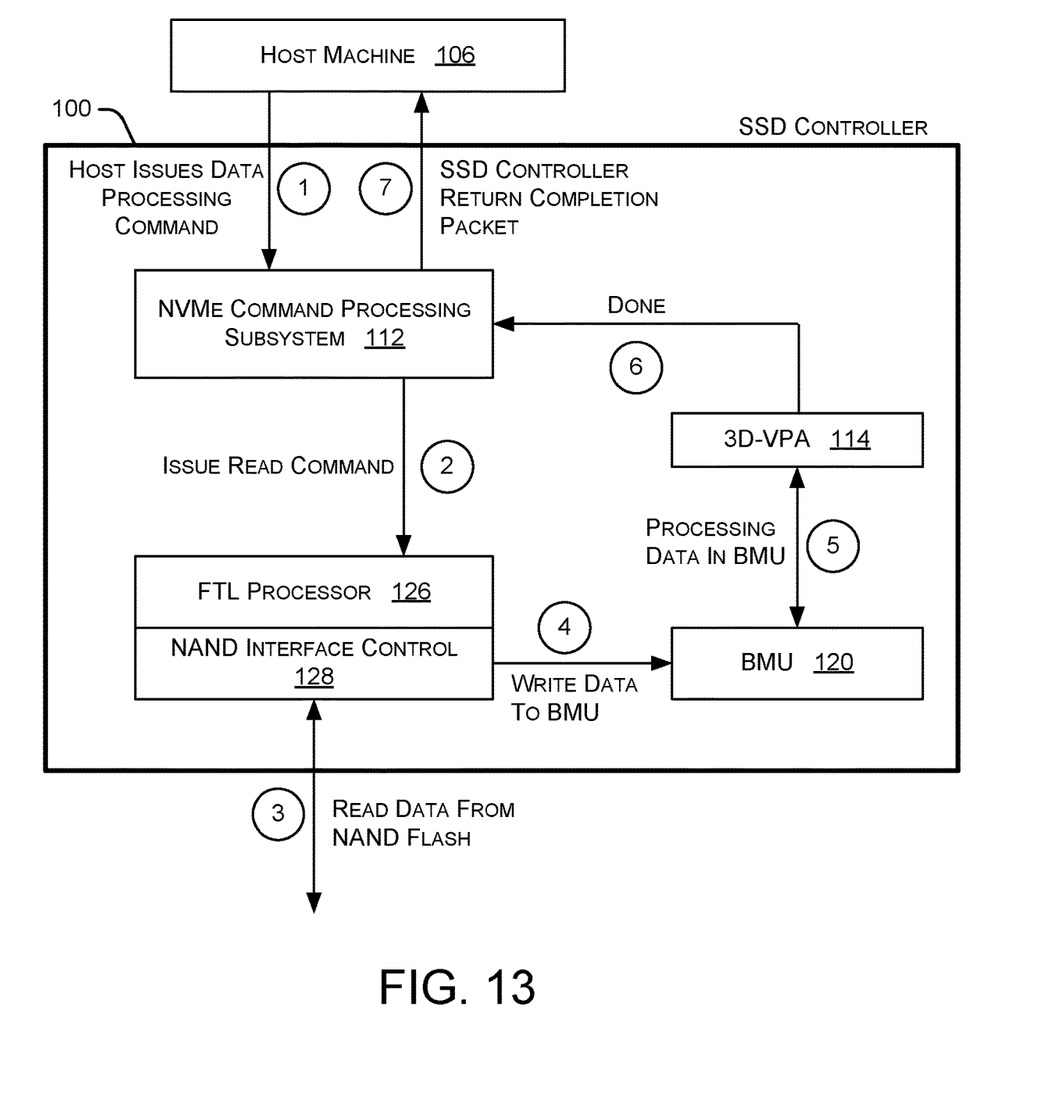
FIG. 13 illustrates an embodiment of a flow for the off-line processing command when the user data is stored in the NAND flash.

FIG. 13 illustrates an embodiment of a flow for the off-line processing command when the user data is stored in the NAND flash. In some embodiments, the systems and methods described herein support off-loading of processing requests. In this situation, similar to the config data, the user data for processing may be stored in NAND flash and host memory in a host machine.

The 3D-VPA is suitable for processing different types of off-loaded processing tasks, an example of which is shown in FIG. 13. After processing, the data is stored in an SRAM or DRAM in BMU 120. The host can then issue another command to load the processed data to host memory or store the processed data back to NAND storage. If the size of the resulting data is compact enough (e.g., less than a DWORD (double word)), the system can send the data through the completion packet, which eliminates the need for the extra host command. In some embodiments, the extra host command refers to the host system sending an extra command to fetch the results from SSD controller 100.

As shown in FIG. 13, host machine 106 issues (1) a data processing command to NVMe command processing subsystem 112, which issues (2) a read command to FTL processor 126. NAND interface control 128 reads (3) data from a NAND flash and writes (4) data to BMU 120. 3D-VPA 114 processes (5) the data in BMU 120. When finished with the processing, 3D-VPA 114 sends (6) a done processing status update message to NVMe command processing subsystem 112, which sends (7) a completion packet to host machine 106.

Figure 14:
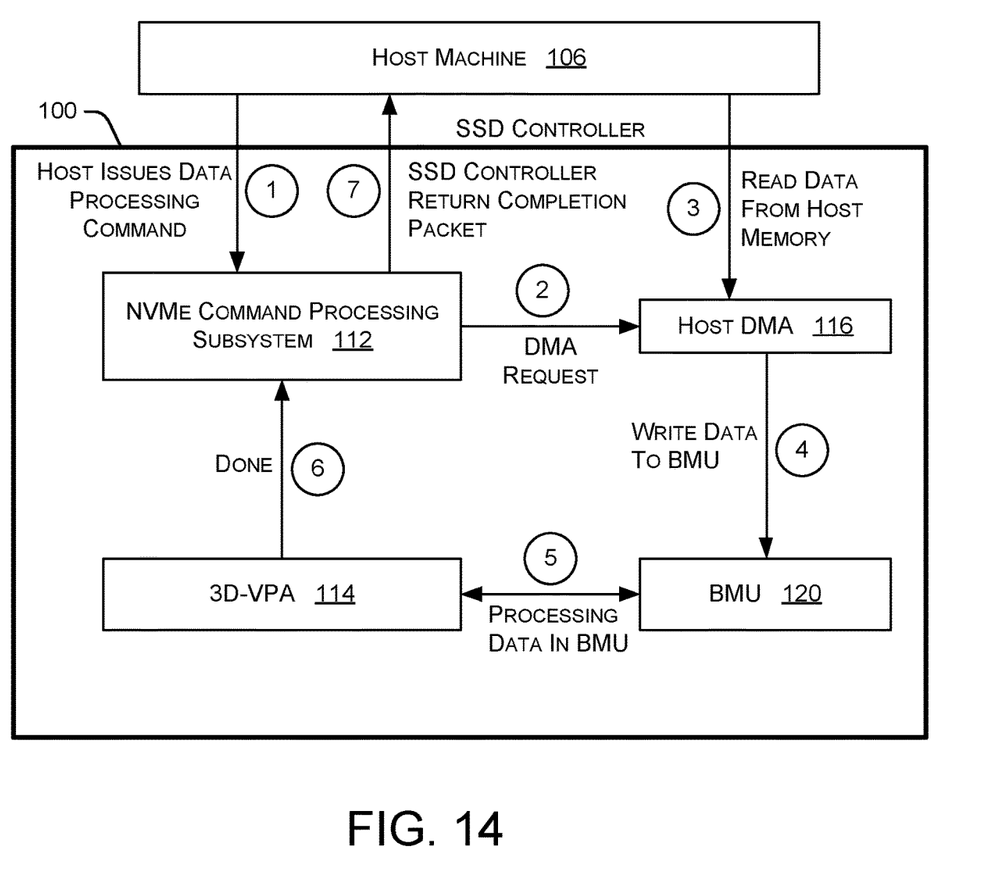
FIG. 14 illustrates an embodiment of a flow for the off-line processing command when the user data is stored in the host memory.

FIG. 14 illustrates an embodiment of a flow for the off-line processing command when the user data is stored in the host memory. In some embodiments, host DMA 116 is used to read user data from host memory for processing. As with config data, host DMA 116 can read data from the CMB. After storing data in BMU 120, 3D-VPA 114 is activated for data processing. After processing, the data is stored back to the SRAM or DRAM controlled by BMU 120. As discussed above, host machine 106 can issue another command to read the data back to host memory or store the data to NAND flash. Alternatively, the results can be sent back to host machine 106 through the completion packet if the size is compact enough.

As shown in FIG. 14, host machine 106 issues (1) a data processing command to NVMe command processing subsystem 112, which then sends (2) a DMA request to host DMA 116. Host DMA 116 also receives (3) an instruction to read data from host memory from host machine 106. Host DMA 116 sends (4) a write data request to BMU 120. 3D-VPA 114 processes (5) the data written to BMU 120. When the data processing is finished, 3D-VPA 114 then sends (6) a data processing done status update to NVMe command processing subsystem 112, which sends (7) a completion packet to host machine 106.

The described systems and methods provide a flexible and configurable approach to address the growing demands for computational storage. Based on the increasing storage requirements of the marketplace, this provides a dedicated architecture designed for computational storage. These systems and methods provide multiple power-on initialization and dynamic update methods. Additionally, multiple in-situ methods, in-line processing, and host off-load techniques are described.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A storage drive controller comprising:
   a non-volatile memory subsystem configured to process a plurality of commands with respect to a non-volatile storage device;
   a plurality of versatile processing array slices coupled to the non-volatile memory subsystem, wherein the plurality of versatile processing array slices are configured to receive configuration commands programming the plurality of versatile processing array slices to perform a plurality of in-situ computation tasks; and
   a host direct memory access module configured to provide direct access to at least one host memory device, the host direct memory access module configured to:
   read data from the at least one host memory device; and
   submit the data to the plurality of versatile processing array slices to perform the plurality of in-situ computation tasks.

2. The storage drive controller of claim 1, wherein the storage drive controller is a solid-state drive controller.

3. The storage drive controller of claim 1, wherein the plurality of versatile processing array slices are arranged to form a 3-dimensional versatile processing array.

4. The storage drive controller of claim 1, wherein the plurality of versatile processing array slices are coupled to an interconnect that allows the plurality of versatile processing array slices to communicate with one another.

5. The storage drive controller of claim 1, wherein each of the plurality of versatile processing array (VPA) slices includes:
a central processing unit;
a (VPA) memory device;
a dynamic configure interface; and
a field-programmable gate array/digital signal processing array.

6. The storage drive controller of claim 5, wherein the central processing unit includes:
a master interface;
a central processing unit extension instruction interface; and
a peripheral interface.

7. The storage drive controller of claim 5, wherein the dynamic configure interface includes a direct memory access engine.

8. The storage drive controller of claim 1, further comprising a buffer management unit (BMU) coupled to the plurality of versatile processing array slices and coupled to a BMU memory device.

9. The storage drive controller of claim 1, wherein the storage drive controller is configured to process non-volatile memory commands and vendor unique processing commands simultaneously.

10. The storage drive controller of claim 1, wherein each of the plurality of versatile processing array slices is configured to perform a specific task.

11. The storage drive controller of claim 1, wherein the non-volatile memory subsystem includes:
a plurality of central processing units; and
a message channel coupled to each of the plurality of central processing units, wherein the message channel allows the plurality of central processing units to communicate with one another.

12. A storage drive controller comprising:
a non-volatile memory subsystem configured to process a plurality of commands with respect to a non-volatile storage device;
a plurality of versatile processing array slices coupled to the non-volatile memory subsystem, wherein the plurality of versatile processing array slices are configured to receive configuration commands programming the plurality of versatile processing array slices to perform a plurality of in-situ computation tasks;
wherein the plurality of versatile processing array slices are arranged to form a 3-dimensional versatile processing array; and
a host direct memory access module configured to provide direct access to at least one host memory device, the host direct memory access module configured to:
read data from the at least one host memory device; and
submit the data to the plurality of versatile processing array slices to perform the plurality of in-situ computation tasks.

13. The storage drive controller of claim 12, wherein each of the plurality of versatile processing array (VPA) slices includes:
a central processing unit;
a VPA memory device;
a dynamic configure interface; and
a field-programmable gate array/digital signal processing array.

14. The storage drive controller of claim 13, wherein the central processing unit includes:
a master interface;
a central processing unit extension instruction interface; and
a peripheral interface.

15. The storage drive controller of claim 13, wherein the dynamic configure interface includes a direct memory access engine.

16. The storage drive controller of claim 12, wherein the storage drive controller is configured to process non-volatile memory commands and vendor unique processing commands simultaneously.

17. The storage drive controller of claim 12, wherein the plurality of versatile processing array slices are coupled to an interconnect that allows the plurality of versatile processing array slices to communicate with one another.

* * * * *